G. SMITH.
ROASTER OR BAKER.
APPLICATION FILED APR. 3, 1911.
1,051,283.
Patented Jan. 21, 1913.
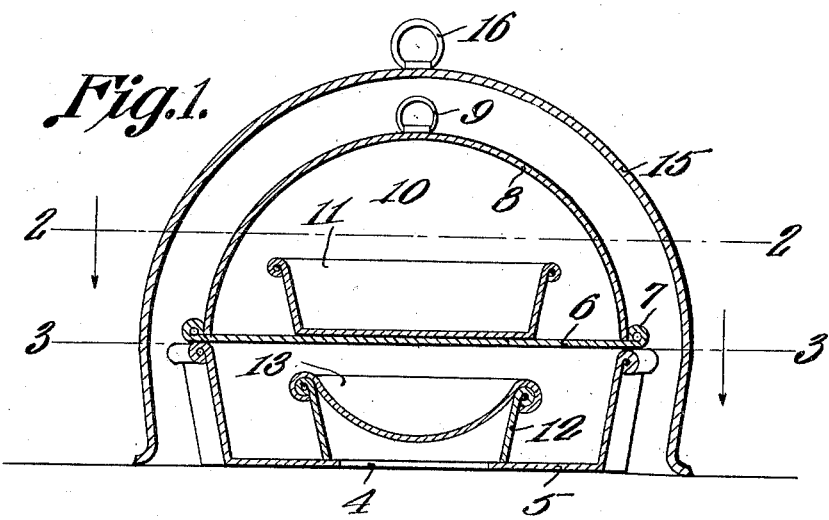
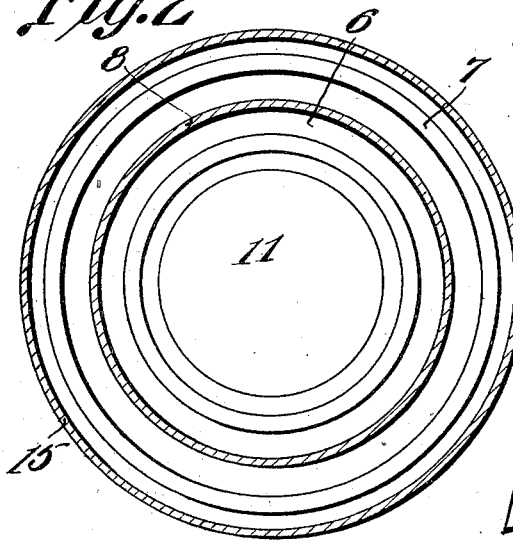
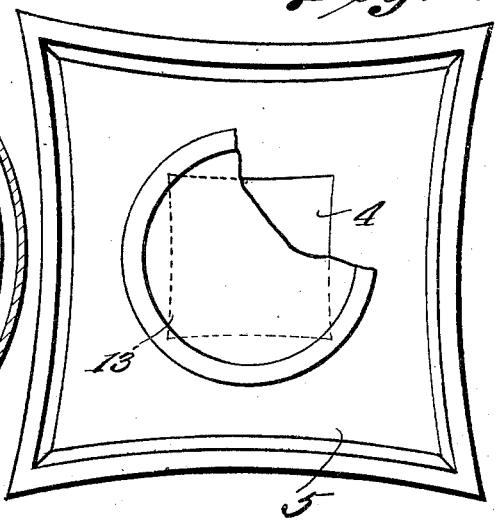
Witnesses
Gertrude Smith,
Inventor
by C. A. Snow & Co.
Attorneys

UNITED STATES PATENT OFFICE.

GERTRUDE SMITH, OF VALDOSTA, GEORGIA.

ROASTER OR BAKER.

1,051,283.  Specification of Letters Patent.  Patented Jan. 21, 1913.

Application filed April 3, 1911. Serial No. 618,717.

*To all whom it may concern:*

Be it known that I, GERTRUDE SMITH, a citizen of the United States, residing at Valdosta, in the county of Lowndes and State of Georgia, have invented a new and useful Roaster or Baker, of which the following is a specification.

This invention relates to roasters or bakers, and has for its object to provide means for roasting or baking edibles in a manner so as to apply a similar amount of heat to the article or substance being roasted or baked from all sides thereof, including the top and bottom, therefore to evenly roast or bake the same.

To the above ends this invention resides in the novel construction and arrangement of parts as hereinafter described and claimed, reference being had to accompanying drawings, wherein;—

Figure 1 is a vertical central section through the roasting or baking apparatus. Fig. 2 is a horizontal section on the line 2—2 of Fig. 1. Fig. 3 is a horizontal section on the line 3—3 of Fig. 1.

Referring in detail to the drawing, wherein similar reference characters indicate similar parts, 6 designates an imperforate plate of suitable metal and circular in contour with its edges upturned as designated by the numeral 7, and 8, an imperforate hood which rests upon the said plate to form a baking or roasting chamber 10. The plate 6 is supported by means of a rectangular receptacle 5, the sides of which are concaved, and which has a square or rectangular opening 4 in the bottom thereof. The plate 6 rests upon the intermediate portions of the sides of the receptacle 5 thereby leaving the corners uncovered to provide passages from the interior of the receptacle 5 to the exterior thereof. The ring or sleeve 12 is seated upon and secured to the bottom of the receptacle 5 over the opening 4 therein so as to leave the corners of the said opening uncovered, and a water receptacle or bowl 13 is supported on the upper end of the said ring or sleeve below the central portion of the plate 6, the edges of the receptacle or container 13 seating on the upper end of the ring or sleeve and the receptacle or container depending therein.

15 designates an outer imperforate hood which is set over the hood 8, the hoods 8 and 15 being provided with the handles 9 and 16, respectively.

In use, the apparatus is placed over a suitable source of heat, and the article or substance to be roasted or baked is placed on the plate 6 at the central portion thereof, there being shown in Fig. 1 a pan or dish 11 for containing the article or substance to be baked or roasted. The heat in rising through the opening 4 strikes the water receptacle 13, which has previously been filled with water, causing the water to become heated and evaporate, the steam striking the plate 6 beneath the pan 11. The corners of the opening 4 being uncovered permits a portion of the heat to escape around the sleeve 12 and strike the plate 6 around the periphery thereof to penetrate the said plate around the periphery and heat the baking or roasting chamber, and the steam in rising from the receptacle 13 and striking the plate 6 is spread to pass outwardly and in so doing become superheated by the heat rising to strike the plate 6. The superheated steam then passes out of the receptacle 5 through the uncovered corners thereof into the space within the outer hood 15 and surrounds the hood 8, to also heat the baking or roasting chamber from above. By this combination, that is, the steam striking the plate 6 beneath the pan 11, the heat rising to strike the plate 6 around the periphery thereof, and the superheated steam passing out into the space beneath or within the outer hood 15, accomplishes the object sought in an efficient manner.

What is claimed as new is:—

1. In a roaster or baker, a plate, a hood resting thereon to form a roasting or baking chamber, means for supporting the said plate over a source of heat and for permitting steam to pass from below the plate, an outer hood inclosing the said parts, a water receptacle below the central portion of the said plate, and means carried by the aforesaid means for supporting the water receptacle and coöperating with the said means for directing the greater portion of heat against the receptacle and for directing the remaining heat against the said plate at the periphery thereof, whereby the steam in rising from the water receptacle strikes the said plate at the center and then passes outwardly to be superheated by the heat which strikes the periphery of the plate and then passes out into the space within the outer hood in a superheated state, for the purpose described.

2. In a roaster or baker, a receptacle having an opening in its bottom, an imperforate plate seated on the upper edges of the receptacle and being of a different contour than the receptacle whereby portions of the receptacle project beyond the plate and the plate having its edges upturned, a sleeve secured to the receptacle over the opening therein and being of a different contour than the said opening whereby parts of the said opening project beyond the said member, a water container having its edges seating on the upper end of the said sleeve and depending therein, an imperforate hood seatable on the said plate and forming a roasting or baking chamber, and an outer imperforate hood for inclosing all of said parts.

In testimony that I claim the foregoing as my own, I have hereto affixed my signature in the presence of two witnesses.

GERTRUDE SMITH.

Witnesses:
J. T. BEALOUR,
KLEM STATEN.

Copies of this patent may be obtained for five cents each, by addressing the "Commissioner of Patents, Washington, D. C."